United States Patent
Innis, Jr.

Patent Number: 6,146,020
Date of Patent: Nov. 14, 2000

[54] SEAL ASSEMBLY FOR ROLLING MILL OIL FILM BEARING

[75] Inventor: Charles L. Innis, Jr., Paxton, Mass.

[73] Assignee: Morgan Construction Company, Worcester, Mass.

[21] Appl. No.: 09/258,781

[22] Filed: Feb. 26, 1999

[51] Int. Cl.[7] .................................................. F16J 15/32
[52] U.S. Cl. ...................... 384/486; 384/130; 384/488; 277/552
[58] Field of Search .................................. 384/147, 130, 384/139, 140, 22, 484, 486, 488, 397; 277/928, 552

[56] References Cited

U.S. PATENT DOCUMENTS

| | | |
|---|---|---|
| 3,190,661 | 6/1965 | Wahl et al. . |
| 3,832,021 | 8/1974 | Jennings et al. . |
| 4,128,248 | 12/1978 | Kabelitz et al. . |
| 4,153,259 | 5/1979 | Torstensson . |
| 4,341,426 | 7/1982 | Claspp . |
| 4,435,096 | 3/1984 | Petros ..................................... 384/147 |
| 4,494,760 | 1/1985 | Spargo . |
| 4,756,536 | 7/1988 | Belcher . |
| 4,770,548 | 9/1988 | Otto . |
| 4,772,138 | 9/1988 | Dreschmann et al. ................... 384/488 |
| 4,819,949 | 4/1989 | Otto .......................................... 277/29 |
| 5,009,435 | 4/1991 | Villanyi et al. . |
| 5,137,285 | 8/1992 | Pick ........................................... 277/47 |
| 5,553,870 | 9/1996 | Czekansky et al. ..................... 277/134 |
| 6,053,501 | 4/2000 | Innis, Jr. et al. ......................... 277/571 |

*Primary Examiner*—Khoi Q. Ta
*Attorney, Agent, or Firm*—Samuels, Gauthier & Stevens

[57] ABSTRACT

A circular seal assembly is provided for a roll in a rolling mill. The roll has a neck with a tapered section leading from a roll end face to a reduced diameter section rotatably supported in a non-rotating bearing chock. The chock is spaced axially from the roll end face to define a circular gap therebetween, and the seal assembly is adapted to span the gap. The seal assembly comprises a rigid circular seal end plate adapted to be fixed to the chock at a location cooperating with associated resilient seal components to subdivide the gap into an inboard chamber adjacent the roll end face and an outboard chamber adjacent the chock. A vent connection is provided in an upper quadrant of the seal end plate between the inboard and outboard chambers.

9 Claims, 2 Drawing Sheets

SEAL ASSEMBLY FOR ROLLING MILL OIL FILM BEARING

BACKGROUND OF THE INVENTION

1. Field of the Invention

This invention relates generally to rolling mill oil film bearings, and is concerned in particular with an improved seal assembly for use in such bearings.

2. Description of the Prior Art

A typical rolling mill oil film bearing and its associated seal assembly is disclosed in FIG. 1. In this type of bearing, a tapered section 10 of the roll neck leads from a roll end face 12 to a continuing tapered section 14 having a sleeve 16 fixed thereto by any known means, e.g., one or more keys 18. The sleeve in turn is surrounded by a bushing 20 fixed within a chock 22, with the chock being spaced axially from the roll end face to define a circular gap 23 therebetween. A circular seal assembly 24 spans the gap and is internally subdivided by coacting seal components into inboard and outboard chambers 26, 28.

During rolling, the roll is cooled by externally applied rolling solutions, and the roll neck is rotatably supported on a film of oil supplied continuously between the sleeve 16 and bushing 20. The externally applied rolling solutions are mainly deflected away from the bearing by the seal assembly 24. Any rolling solution which penetrates into the seal assembly is captured in the inboard chamber 26 and drained away to the mill sump through a lower outlet opening 27.

Oil escaping from between the sleeve 16 and bushing 20 is captured in the outboard chamber 28 and drained through a bore 30 in the chock to a sump 32. From here, the oil is returned through horizontal piping 34, T-connections 36 and flexible hoses 38 to vertical piping 40 leading to the mill lubrication system. The lubrication system cools and filters the oil before recirculating it to back the bearings.

The vertical piping 40 includes vents 42 for admitting air into the oil drainage system. During normal operating conditions, the level of oil outflow is as indicated schematically at 44. The outflowing oil continuously entrains and removes air from the outboard chamber 28, and that air is continuously replenished by an inflow of air (indicated by broken arrows) admitted via the vents 42. Thus, a balanced pressure is maintained between the inboard and outboard chambers 26, 28 which allows the seal assembly to function normally.

However, should air inflow become restricted or interrupted, either due to blockage of the vents, or filling of the drain lines with oil due to restricted drainage, then continued removal of entrained air from the outboard chamber will reduce the pressure in that chamber to below atmospheric. This in turn will cause the oil level to rise, eventually reaching a level at which the seal assembly is no longer able to perform adequately, resulting in oil leakage.

Conventional externally protruding or exposed venting devices have been considered but rejected because of the potential for damage and consequent leakage or blockage as a result of exposure to mill scrap, wrecks, improper handling, etc.

A primary objective of the present invention is to insure that the outboard chamber 28 is continuously supplied with air in sufficient quantity to replace the air being entrained with the outflow of oil, irrespective of the oil level in the bearing drainage system and/or the condition of the drainage vents.

A companion objective of the present invention is to achieve the aforesaid continuity of air supply by a venting arrangement which is completely contained within the seal assembly and thus immune from damage or blockage caused by exposure to a sometimes hostile mill environment and/or mishandling by mill personnel.

SUMMARY OF THE INVENTION

In accordance with the present invention, an additional air passageway is located within an upper portion of the seal assembly at a location interconnecting the inboard and outboard chambers 26, 28. The air passageway is configured to prevent cross contamination of externally applied rolling solutions and bearing oil, and is positioned to remain open irrespective of the level of outflowing oil in the bearing drainage system.

BRIEF DESCRIPTION OF THE DRAWINGS

These and other objects, features and advantages of the present invention will now be described in greater detail with reference to the accompanying drawings, wherein.

DETAILED DESCRIPTION OF PREFERRED EMBODIMENT

Figure 1:
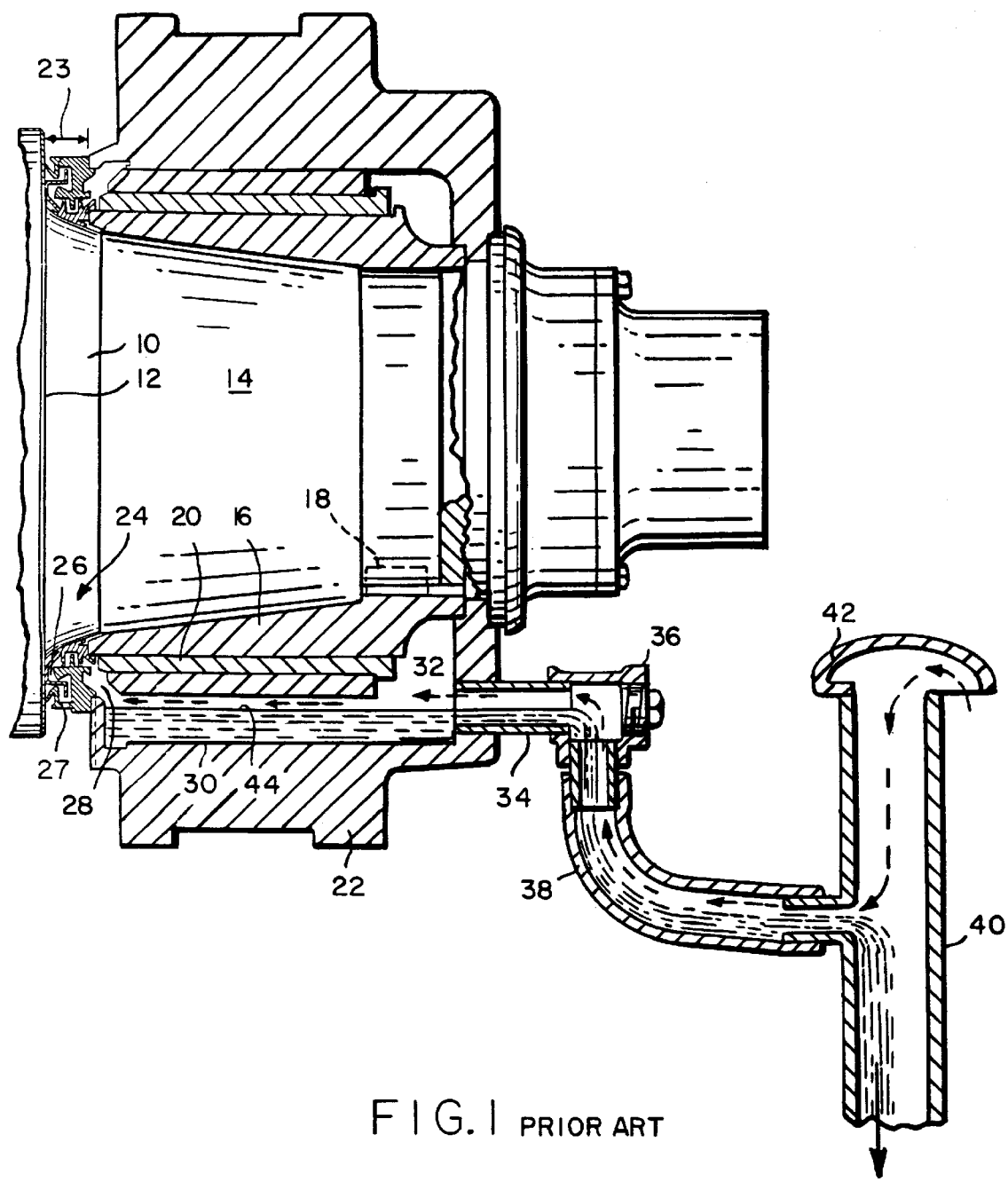
FIG. 1 is a longitudinal sectional view through a typical oil film bearing and associated seal assembly, with a partial schematic illustration of the bearing drainage system.
Figure 2:
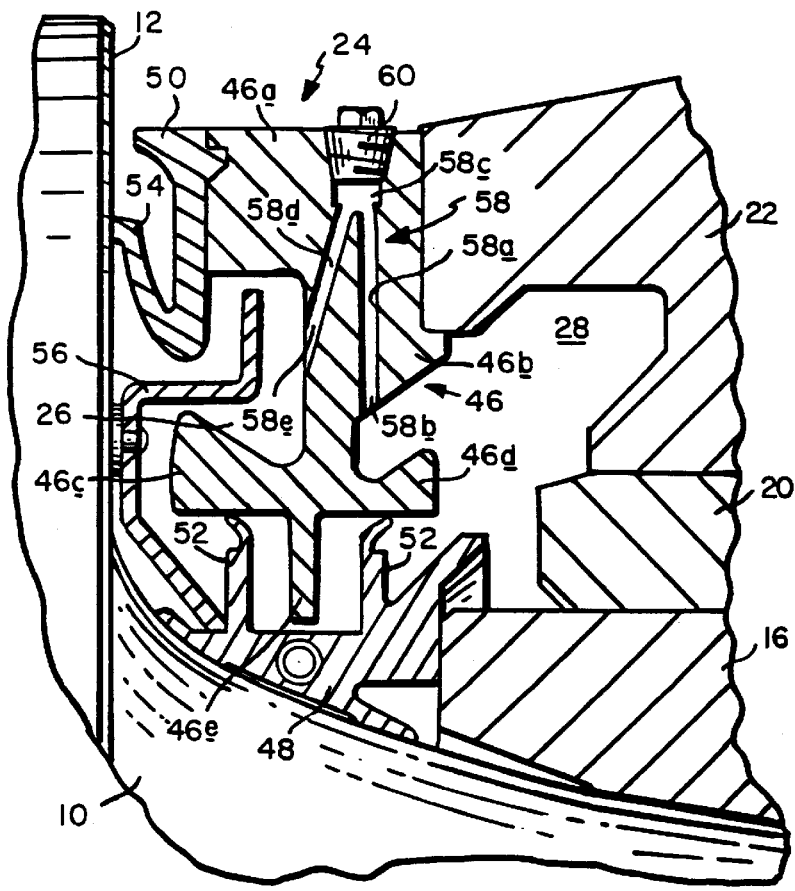
FIG. 2 is an enlarged sectional view taken through an upper portion of the seal assembly modified to incorporate an additional air passageway in accordance with the present invention.

Referring additionally to FIG. 2, it will be seen that the seal assembly 24' of the present invention includes a rigid circular seal end plate 46 having an outer rim 46a fixed to the chock 22 by bolts or the like (not shown). The seal end plate includes an annular flange 46b projecting radially inwardly from the rim 46a. The flange 46b terminates at oppositely projecting shoulders 46c, 46d separated by an inwardly projecting circular rib 46e.

A resilient neck seal 48 is mounted on the tapered neck section 10, and a resilient coolant guard 50 is secured to the outer rim 46a of the seal end plate 46. The neck seal 48 has legs 52 terminating in lips in sliding contact with the seal end plate shoulders 46c, 46d, and the coolant guard has a lip 54 in sliding contact with the roll end face 12. With this arrangement, the seal end plate 46 cooperates with the neck seal 48 and coolant guard 50 to subdivide the gap 23 between the roll end face 12 and the chock 22 into the inboard and outboard chambers 26, 28. A seal inner ring 56 rotates with the roll and serves to create a labyrinth within the inboard chamber 26.

In accordance with the present invention, a connecting passageway 58 is provided in the seal end plate 46 between the inboard and outboard chambers 26 and 28. Passageway 58 includes an outboard leg 58a extending generally radially outwardly from an opening 58b communicating with the outboard chamber 28 to a blind bore 58c closed by a threaded plug 60. An inboard leg 58d similarly extends radially outwardly at an angle with respect to leg 58a from an opening 58e communicating with the inboard chamber 26 to the blind bore 58c, the latter serving as a junction between the legs 58a, 58d.

Figure 3:
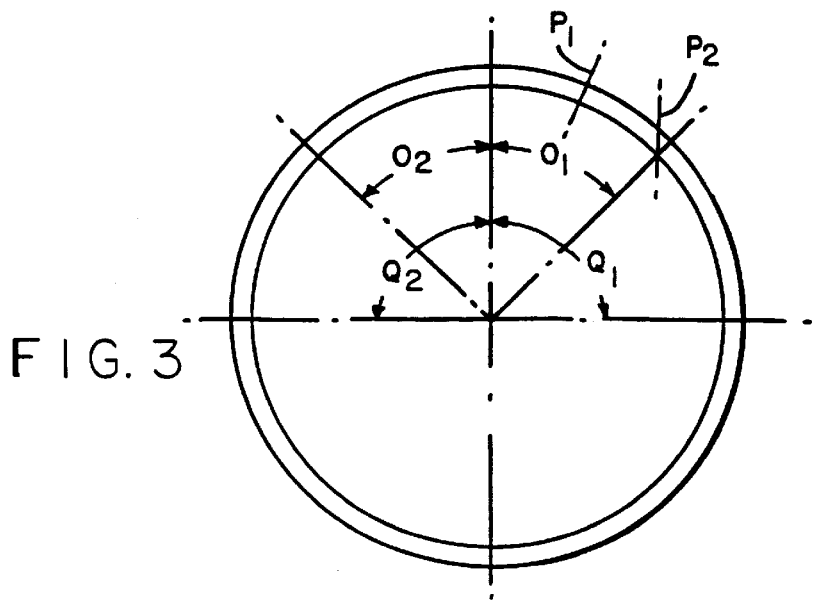
FIG. 3 is a schematic view showing alternative positions and orientations of the additional air passageway shown in FIG. 2.

With reference to FIG. 3, it will be seen that the connecting passageway 58 can either lie in a plane $P_1$ passing through the bearing center, or it can lie in a plane $P_2$ disposed laterally of the bearing center. In all cases, however, the connecting passageway 58 will be located in an upper quadrant $Q_1$ or $Q_2$ of the seal end plate, and preferably in an upper octant $O_1$ or $O_2$.

The oil side opening 58b is located in a sloping surface of the flange 46b shielded by the shoulder 46d from oil being centrifugally thrown off by the neck seal 48. The coolant side opening 58e terminates on an acute angle to a radial surface of the flange 46b, at a location radially outboard of the shoulder 46c at a location outside the trajectory of any coolant thrown off by the inner seal ring 56.

Air for venting the outboard chamber 28 will be admitted into the labyrinth area of the inboard chamber 26 via the lower drain opening 27. From here, air will flow radially outwardly and upwardly through leg 58d to junction 58c, and then radially inwardly and downwardly into the outboard chamber 28 via leg 58a. The orientation of the openings 58b, 58e and their communicating passageway sections 58a, 58d is such that any oil or coolant splashing upwardly into them will drain back into the environment of origin, thereby effectively avoiding cross contamination. Any possibility of cross contamination can be further minimized by locating the passageway 58 in a non-radial plane as indicated at $P_2$ in FIG. 3 in order to maximize the length of the passageway sections 58a, 58d.

In light of the foregoing, it will now be appreciated by those skilled in the art that the configuration and location of passageway 58 insures that the outboard chamber 28 is continuously supplied with air, irrespective of conditions in the bearing drainage system. Damage and consequent leakage due to exposure to a sometimes hostile mill environment and/or mishandling is avoided by locating the vent passageway entirely within the robust seal end plate 46.

I claim:

1. A circular oil seal assembly for a roll in a rolling mill, the roll having a neck with a tapered section leading from a roll end face to a reduced diameter section rotatably supported in a non-rotating bearing chock, with the chock being spaced axially from the roll end face to define a circular gap therebetween, said circular seal assembly adapted to span, said seal assembly comprising a rigid circular seal end plate adapted to be fixed to said chock, said seal end plate cooperating with associated resilient seal components to subdivide said gap into an inboard chamber adjacent said roll end face and an outboard chamber adjacent said chock, and connecting means in an upper quadrant of said seal end plate for establishing a vent connection between said inboard and outboard chambers.

2. The seal assembly of claim 1 wherein said seal end plate includes an outer circular rim with an annular flange protruding radially inwardly therefrom between said inboard and outboard chambers, said connecting means comprising inboard and outboard passages leading respectively from said inboard and outboard chambers through said annular flange to a junction in said rim.

3. The seal assembly of claim 2 wherein said seal end plate further includes shoulders extending axially in opposite directions from said flange into said inboard and outboard chambers, said inboard and outboard passages communicating with said inboard and outboard chambers at locations disposed radially outwardly of said shoulders.

4. The seal assembly of claim 2 wherein said inboard and outboard passages lie in a plane passing through the bearing axis.

5. The seal assembly of claim 2 wherein said inboard and outboard passages lie in a plane disposed laterally of the bearing axis.

6. The seal assembly of claim 1 wherein said connecting means is in an upper octant of said seal end plate.

7. A circular seal assembly in combination with for a roll in a rolling mill, the roll having a neck with a tapered section leading from a roll end face to a reduced diameter end section rotatably carried in a non-rotating chock on a film of bearing oil, with the chock being spaced axially from the roll end face to define a circular gap therebetween, said seal assembly spanning said gap and surrounding said tapered neck section, said seal assembly including a circular seal end plate secured to said chock and subdividing said gap into an inboard chamber adjacent said roll end face and an outboard chamber adjacent said chock, multiple seal components coacting with said seal end plate to prevent externally applied rolling solutions from penetrating into said outboard chamber and to prevent said bearing oil from escaping into said inboard chamber, and connecting means in an upper quadrant of said seal end plate for establishing a vent connection between said inboard and outboard chambers.

8. In an oil film bearing for a roll in a rolling mill, the roll having a neck with a tapered section leading from a roll end face to a reduced diameter section rotatably carried on a film of oil in a non-rotating chock, said bearing including a seal assembly adapted to encircle said tapered neck section between said roll end face and said chock, said circular seal end plate disposed in said seal assembly, said seal end plate being configured to subdivide said seal assembly into an inboard chamber adjacent said roll end face and an outboard chamber adjacent said chock, and connecting means in an upper quadrant of said seal end plate for providing a vent connection between said chambers.

9. The seal assembly of claims 7 or 8 wherein said connecting means is in an upper octant of said seal end plate.

* * * * *

UNITED STATES PATENT AND TRADEMARK OFFICE
CERTIFICATE OF CORRECTION

PATENT NO. : 6,146,020
DATED : November 14, 2000
INVENTOR(S) : Charles L. Innis, Jr.

It is certified that error appears in the above-identified patent and that said Letters Patent is hereby corrected as shown below:

Column 3,
Line 41, after span, insert -- said gap --; and

Column 4,
Line 20, delete "for".

Signed and Sealed this

Eighteenth Day of September, 2001

Attest:

*Nicholas P. Godici*

NICHOLAS P. GODICI
*Attesting Officer*   *Acting Director of the United States Patent and Trademark Office*